United States Patent
Jeong et al.

(10) Patent No.: US 7,110,205 B2
(45) Date of Patent: Sep. 19, 2006

(54) METHOD FOR CONTROLLING START OF ADAPTIVE SPINDLE MOTOR AND DISK DRIVE USING THE METHOD

(75) Inventors: Jun Jeong, Suwon-si (KR); Kwang-jo Jung, Suwon-si (KR); Dong-wook Lee, Suwon-si (KR); Tae-hoon Lee, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/059,570

(22) Filed: Feb. 17, 2005

(65) Prior Publication Data

US 2005/0179410 A1    Aug. 18, 2005

(30) Foreign Application Priority Data

Feb. 17, 2004    (KR)    ............... 10-2004-0010454

(51) Int. Cl.
*G11B 15/18*    (2006.01)
(52) U.S. Cl. ............................................. 360/69
(58) Field of Classification Search ............... None
See application file for complete search history.

(56) References Cited

U.S. PATENT DOCUMENTS

| | | | |
|---|---|---|---|
| 5,675,558 A * | 10/1997 | Katoh | 369/30.15 |
| 2002/0101679 A1* | 8/2002 | Koizumi et al. | 360/69 |
| 2003/0174428 A1* | 9/2003 | Sakamoto | 360/70 |

FOREIGN PATENT DOCUMENTS

| | | |
|---|---|---|
| JP | 08-287590 | 1/1996 |
| KR | 95-20818 | 7/1995 |
| KR | 95-24034 | 8/1995 |
| KR | 1995-0010280 | 9/1995 |
| KR | 1019980014310 | 5/1998 |

* cited by examiner

*Primary Examiner*—Hoa T. Nguyen
*Assistant Examiner*—Mitchell Slavitt
(74) *Attorney, Agent, or Firm*—Staas & Halsey LLP

(57) ABSTRACT

A method of controlling starting current of an adaptive spindle motor in consideration of maximum allowable consumption power and a disk drive using the method. The method includes measuring a supply voltage supplied to the disk drive, calculating a maximum current that can be supplied to the spindle motor in a range of maximum allowable power in correspondence to the supply voltage measured in the measuring of the supply voltage, and applying the calculated maximum current to the spindle motor to start the spindle motor.

20 Claims, 3 Drawing Sheets

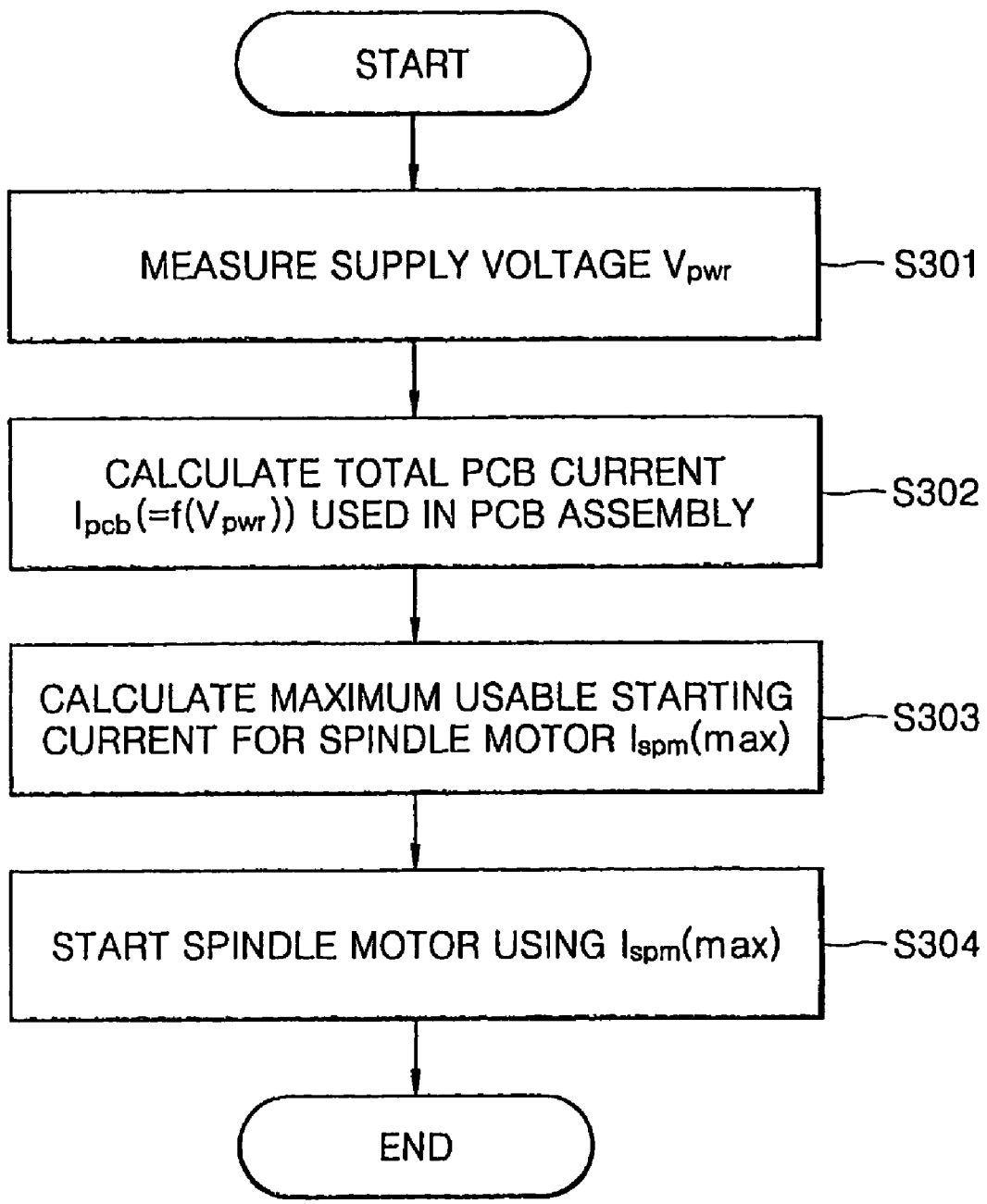

METHOD FOR CONTROLLING START OF ADAPTIVE SPINDLE MOTOR AND DISK DRIVE USING THE METHOD

CROSS-REFERENCE TO RELATED APPLICATION

This application claims the priority of Korean Patent Application No. 2004-10454, filed on Feb. 17, 2004, in the Korean Intellectual Property Office, the disclosure of which is incorporated herein in its entirety by reference.

BACKGROUND OF THE INVENTION

1. Field of the Invention

The present invention relates to a method of controlling a spindle motor used in a disk drive and apparatus thereof, and more particularly, to a method of controlling starting current of an adaptive spindle motor in consideration of maximum allowable consumption power, and a disk drive using the method.

2. Description of the Related Art

A typical example of a method of controlling an adaptive spindle motor is disclosed in Korean Patent Publication No. 1998-0014310, which proposes a solution to a problem due to a voltage drop resulting from a current to be excessively consumed at an initial drive or start up of the spindle motor in a disk drive.

A disk drive utilizing a spindle motor could include a hard disk drive, a CD-ROM drive, a DVD drive, and the like. When power is supplied to the disk drive, the disk drive enters in an initial mode to drive a spindle motor to rotate a disk. The disk drive has a high power consumption at start up such that a paused disk can be started and rotated to reach a desired speed. As such, the disk drive is adapted to supply a maximum current to the spindle motor in a range of the maximum usable power.

However, the maximum usable power is restricted on the basis of maximum usable voltage, and the maximum usable current applied to the spindle motor is also restricted by the maximum usable voltage.

For example, suppose that a disk drive is adapted to utilize a single power supply of 5 V, an allowable supply voltage Vpwr of 4.75 V to 5.25 V, and a usable maximum power Pmax of 5 W, the maximum usable current is determined on the basis of the maximum allowable supply voltage of 5.25 V, the maximum usable current Imax is calculated as the following Equation 1:

$$Imax = Pmax/Vpwr = 5\ W/5.25\ V = 0.95\ A \quad (1)$$

A starting current of the spindle motor is determined as a result of subtracting a printed circuit board (PCB) current used in a circuit other than the spindle motor from the maximum usable current.

Even if the supply voltage Vpwr is decreased in the allowable range, the starting current of the spindle motor is restricted by the maximum usable voltage (i.e., 5.25 V). Consequently, even though more current may be used (or needed) to start the spindle motor, a fixed amount of the current is applied to the spindle motor. As a result, there is a problem in that a time required to increase the rotation speed of the spindle motor to a desired level is extended.

SUMMARY OF THE INVENTION

Accordingly, it is an aspect of the present invention to provide a method of controlling a start of an adaptive spindle motor, by which a starting current supplied to the spindle motor is varied in an optimum condition in a range of a maximum allowable consumption power, even though a supply voltage supplied to a disk drive varies.

Additional aspects and/or advantages of the invention will be set forth in part in the description which follows and, in part, will be obvious from the description, or may be learned by practice of the invention.

The foregoing and/or other aspects may be achieved by providing a method of controlling a starting of a spindle motor used in a disk drive, the method including: measuring a supply voltage supplied to the disk drive; calculating a maximum current that can be supplied to the spindle motor in a range of a maximum allowable power corresponding to the supply voltage and applying the calculated maximum current to the spindle motor to start the spindle motor.

The foregoing and/or other aspects may also be achieved by providing a disk drive including: a disk to store information; a spindle motor to turn the disk; a power supply circuit to supply a desired supply voltage; an analog/digital converter to convert the supply voltage supplied from the power supply circuit into a digital signal; a controller to determine a value of the supply voltage on the basis of the digital signal, and to calculate a maximum value of a current that can be supplied to the spindle motor in a maximum allowable power range corresponding to the determined value of the supply voltage; and a spindle driver to generate a starting current for the spindle motor corresponding to the maximum value of the current calculated by the controller to apply the starting current to the spindle motor.

BRIEF DESCRIPTION OF THE DRAWINGS

The above and/or other aspects and advantages of the present invention will become more apparent by describing in detail exemplary embodiment thereof with reference to the attached drawings in which:

FIG. 3 is a flow chart showing a method of controlling a start of an adaptive spindle motor according to the embodiment of the present invention.

DETAILED DESCRIPTION OF THE PREFERRED EMBODIMENT

Figure 1:
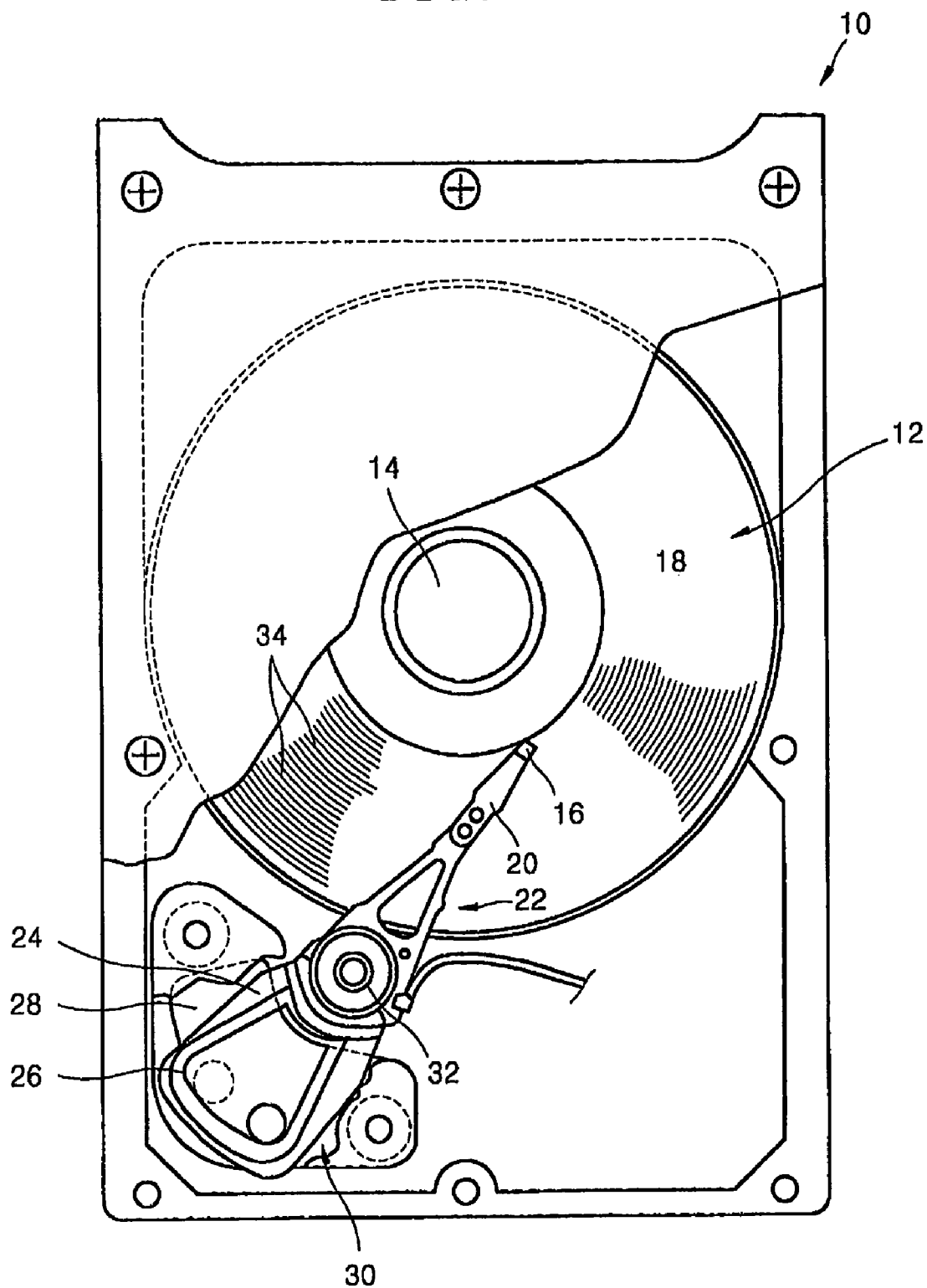
FIG. 1 is a top view of a hard disk drive to which an embodiment of the present invention is adapted.

Reference will now be made in detail to the embodiment of the present invention, an example of which is illustrated in the accompanying drawings, wherein like reference numerals refer to the like elements throughout. The embodiment is described below to explain the present invention by referring to the figures.

FIG. 1 shows construction of a hard disk drive to which the present invention is adapted. The hard disk drive 10 includes at least one magnetic disk 12 rotated by a spindle motor 14. The hard disk drive 10 further includes a transducer 16 disposed near a surface of the disk 12.

The transducer 16 senses and magnetizes a magnetic field of the disk 12 so as to read or write information from or on the disk 12. The transducer 16 is coupled to a surface 18 of the disk 12. A single transducer 16 is illustrated in FIG. 1, but in actuality includes a write transducer to magnetize the disk 12 and a read transducer to sense the magnetic field of the disk 12. The read transducer is made of a magneto-resistive (MR) device. The transducer 16 is generally referred to as a head.

The transducer 16 may be integrated into a slider 20. The slider 20 is adapted to produce an air bearing between the transducer 16 and the surface 18 of the disk 12. The slider 20 is incorporated into a head gimbal assembly 22 attached to an actuator arm 24 having a voice coil 26. The voice coil 26 is positioned adjacent to a magnetic assembly 28 to define a voice coil motor (VCM) 30. A current supplied to the voice coil 26 generates torque rotating the actuator arm 24 relative to a bearing assembly 32. The rotation of the actuator arm 24 causes the transducer 16 to move across the surface 18 of the disk 12.

The information is typically stored in annular tracks 34 of the disk 12, and each track 34 includes a plurality of sectors. Each sector includes a data field and an identification field, and the identification field has a gray code to identify the sector and the track (cylinder). The transducer 16 moves across the surface 18 of the disk 12 to read or write the information from or on other track.

Figure 2:
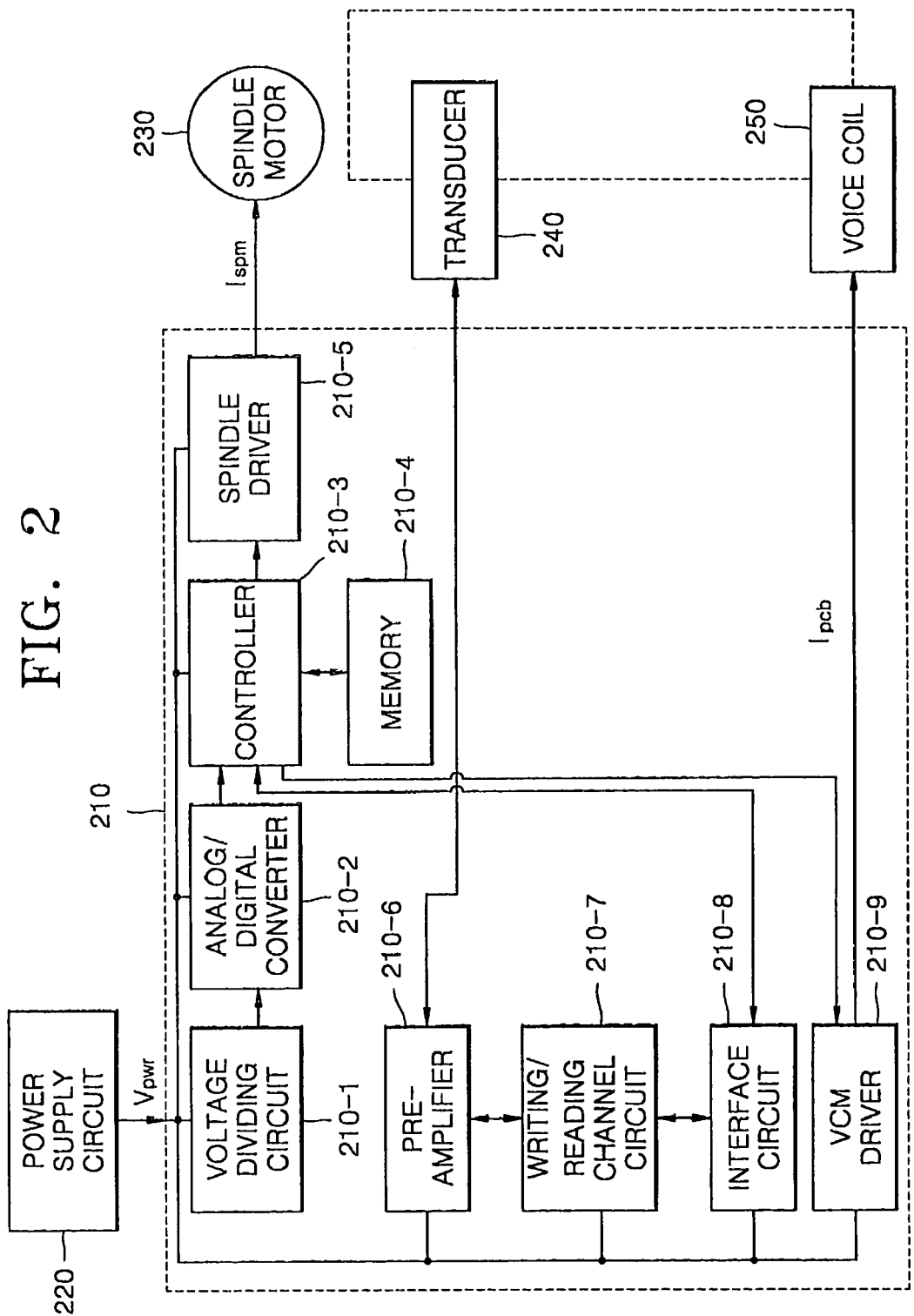
FIG. 2 is an electric circuit diagram of a hard disk drive to which the embodiment of the present invention is adapted.

FIG. 2 shows an electric circuit diagram of the hard disk drive to which the embodiment of the present invention is adapted.

Referring to FIG. 2, the hard disk drive of the present invention includes a PCB assembly 210, a power supply circuit 220, a spindle motor 230, a transducer 240, and a voice coil 250. The hard disk drive and spindle motor 230 correspond to the hard drive 10 and spindle motor 14 of FIG. 1, however, these elements have been renumbered in FIG. 2 for convenience of explanation.

The PCB assembly 210 includes a voltage dividing circuit 210-1, an analog/digital converter 210-2, a controller 210-3, a memory 210-4, a spindle driver 210-5, a pre-amplifier 210-6, a write/read channel circuit 210-7, an interface circuit 210-8, and a VCM driver 210-9.

The memory 210-4 is stored with various programs and data to control the hard disk drive, as well as a program and data to implement a flow chart, shown in FIG. 3.

The pre-amplifier 210-6 includes an amplifying circuit to amplify a signal detected by the transducer 240, a read-current controlling circuit to supply an optimum read current to the transducer 240, and a write-current control circuit to supply a write current.

The power supply circuit 220 inputs an AC power, and rectifies the AC power to generate a DC power required for the hard disk drive.

First, general operation of the hard disk drive will now be described.

In a data read mode, the hard disk drive amplifies the electric signal detected by the transducer 240 (referred to as a head) from the disk. The write/read channel circuit 210-7 encodes the amplified analog signal into the digital signal which can be decoded by a host appliance (not shown), and converts the encoded signal into a data stream to transfer the converted signal to the host appliance through the interface circuit 210-8.

In a data, write mode, the hard disk drive receives the data through the interface circuit 210-8, converts the received data into a binary data stream compatible with a record channel using the write/read channel circuit 210-7, to write a writing current amplified by the pre-amplifier 210-6 on the disk through the transducer 240.

The controller 210-3 generally controls the hard disk drive to analyze a command received through the interface circuit 210-8 and then implement the specified command.

The controller 210-3 is also connected to the VCM driver 210-9 to supply the driving current to the voice coil 250 to apply a control signal to control excitation of a VCM and movement of the transducer 240 to the VCM driver 210-9.

If the supply voltage, Vpwr, is supplied to the PCB assembly 210, the supply voltage Vpwr is voltage-divided by the voltage dividing circuit 210-1, and is converted into the digital signal by the analog/digital converter 210-2 to apply the digital signal to the controller 210-3. The voltage circuit 210-1 may be excluded.

The controller 210-3 determines a value of the supply voltage on the basis of the supply voltage converted into the digital signal before the starting of the spindle motor 230. A maximum value of the current that can be supplied to the spindle motor 230 in the maximum allowable power is calculated according to the determined value of the supply voltage.

First, a total PCB current, Ipcb, used in the PCB assembly 210 before the starting of the spindle motor 230 is calculated from the determined value of the supply voltage.

The PCB current Ipcb can be calculated from a table where the PCB current is previously detected and stored with respect to a constant unit of a supply voltage variation. Alternatively, it can be calculated from a function of the supply voltage approximately calculated from a graph of supply voltage versus the PCB current which is tentatively calculated.

When applying the power, a power consumption P of the hard disk drive is expressed by the following equation 2:

$$P = Ipcb \times Vpwr + Ispm \times Vpwr \leq Pmax \qquad (2)$$

In Equation 2, the power consumption P should be equal to or less than the maximum allowable power Pmax when supplying the power. Ispm represents the starting current for the spindle motor.

$$Ispm \leq (Pmax - Ipcb \times Vpwr)/Vpwr \qquad (3)$$

Then, the maximum Ispm satisfying Equation 3 is calculated to obtain the value of the maximum current to be supplied to the spindle motor 230.

The spindle driver 210-5 generates the starting current for the spindle motor corresponding to the value of the maximum current calculated by the controller 210-3 to apply the starting current to the spindle motor 230, thereby starting the spindle motor 230.

Reference is now to be made to a flow chart of FIG. 3 to describe the method of controlling the starting of the adaptive spindle motor according to the embodiment of the present invention.

When the power is supplied to the hard disk drive, the supply voltage Vpwr applied from the power supply circuit 220 is determined before the starting of the spindle motor 230 (S301).

The total PCB current Ipcb used in the PCB assembly 210 is determined before starting the spindle motor 230 (S302).

The PCB current Ipcb can be determined from a table in a situation where the PCB current is previously detected and stored with respect to a constant unit or increment of a supply voltage variation. Alternatively, the PCB current can be determined from a function of the supply voltage approximately calculated from a graph of PCB current versus the supply voltage which is tentatively calculated.

Then, the maximum usable starting current for the spindle motor Ispm(max) is determined from Equation 3 (S303).

The current corresponding to Ispm(max) obtained from the process S303 is applied to the spindle motor 230 through the spindle driver 210-5 to start the spindle motor 230.

With the above method, if the voltage used in the hard disk drive is less than the maximum usable voltage, the spindle motor can use more starting current. If the starting current of the spindle motor is increased, the torque to the spindle motor can be increased, such that it shortens a time required that a rotation speed of the spindle motor reaches by a desired level.

Since a recent disk drive employs a brushless motor as a spindle motor, a separate rotation detecting sensor is not utilized. As such, the rotation speed of the spindle motor is increased to a counter electromotive force detectable speed by energizing the spindle motor at proper time intervals, when starting the spindle motor. If the rotation speed of the spindle motor is not increased to a counter electromotive force detectable speed through the above process, the process is repeated. The time required for the rotation speed of the spindle motor to reach a desired level is extended. Consequently, the starting current for the spindle motor can be maximized in a range of the maximum allowable consumption power according to the embodiment of the present invention, which can reduce the possibility of such repetition.

As described above, according to the embodiment of the present invention, in consideration of the maximum allowable consumption power for the disk drive, the maximum allowable starting current for the spindle motor is calculated according to the supplied supply voltage to start the spindle motor, thereby shortening the time required for a rotation speed of the spindle motor to reach a desired level.

The embodiment of the present invention may be accomplished by a method, an apparatus, a system, and the like. If performed by software, code segments to execute a necessary operation may be used. Programs or code segments may be stored in a processor-readable medium, or may be sent by a computer data signal combined with a carrier wave via a transferring medium or communication network. The processor-readable medium includes any medium capable of storing or sending information. Examples of the processor-readable medium are an electronic circuit, a semiconductor memory device, a ROM, a flash memory, an erasable ROM, a floppy disk, an optical disk, a hard disk, an optical fiber medium, a radio frequency (RF) network, and the like. The computer data signal includes any signal, which can be transmitted through a transmission medium, such as an electronic network channel, an optical fiber, air, an electromagnetic field, an RF network, and the like.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of controlling a starting of a spindle motor used in a disk drive, the method comprising:
   measuring a supply voltage supplied to the disk drive;
   calculating a maximum current that can be supplied to the spindle motor in a range of a maximum allowable power corresponding to the measured supply voltage; and
   applying the calculated maximum current to the spindle motor to start the spindle motor.

2. The method of claim 1, wherein the calculating of the maximum current comprises:
   calculating a value of PCB power consumption, consumed by the disk drive exclusive of the spindle motor, from the measured supply voltage; and
   determining a value of a starting current for the spindle motor comprising dividing a value obtained by subtracting the value of the PCB power consumption from the maximum allowable power by the measured supply voltage.

3. The method of claim 2, wherein the calculating of the PCB power consumption comprises:
   calculating a PCB current supplied to the disk drive exclusive of the spindle motor from the measured supply voltage; and
   calculating the value of the PCB power consumption by multiplying the calculated PCB current by the measured supply voltage.

4. The method of claim 3, wherein the calculating of the PCB current comprises determining the PCB current from a table which stores a previously detected PCB current is stored with respect to a constant unit of a supply voltage variation.

5. The method of claim 3, wherein the calculating of the PCB current comprises determining the PCB current is from a function of the supply voltage calculated from a graph of PCB current versus the supply voltage.

6. A disk drive, comprising:
   a disk to store information;
   a spindle motor to turn the disk;
   a power supply circuit to supply a desired supply voltage;
   an analog/digital converter to convert the supply voltage supplied from the power supply circuit into a digital signal;
   a controller to determine a value of the supply voltage on the basis of the digital signal, and to calculate a maximum value of a current that can be supplied to the spindle motor in a maximum allowable power in a range corresponding to the determined value of the supply voltage; and
   a spindle driver to generate a starting current for the spindle motor corresponding to the maximum value of the current calculated by the controller to apply the starting current to the spindle motor.

7. The disk drive of claim 6, further comprising a voltage dividing circuit between the power supply circuit and the analog/digital converter.

8. The disk drive of claim 6, wherein the controller calculates a value of a PCB power consumption , which is used by the controller, from the determined supply voltage, and determines a value of a maximum current to be supplied to the spindle motor as a value resulted from dividing a value obtained by subtracting the value of the PCB power consumption from the maximum allowable power by the determined value of the supply voltage.

9. The disk drive of claim 8, wherein a PCB current supplied to the controller is calculated from the determined supply voltage, and the value of the PCB power consumption is calculated by multiplying the PCB current by the determined supply voltage.

10. The disk drive of claim 9, wherein the PCB current is determined from a table which stores a previously detected PCB current detected with respect to a constant unit of a supply voltage variation.

11. The disk drive of claim 9, wherein the PCB current is determined from a function of the supply voltage approximately calculated from a graph of PCB current versus the supply voltage.

12. A method to control a motor used in an apparatus to read or write data from or to an optical storage medium, the method comprising:
   determining a voltage supplied to the apparatus; and
   determining a maximum current to be supplied to the motor according to the determined voltage,
   wherein the motor is a spindle motor.

13. A method to control a motor used in an apparatus to read or write data from or to an optical storage medium, the method comprising:
   determining a voltage supplied to the apparatus; and
   determining a maximum current to be supplied to the motor according to the determined voltage,
   wherein the determining of the maximum current comprises determining the maximum current so that $$Ispm \leq (Pmax - Ipcb \times Vpwr)/Vpwr$$

is satisfied, wherein:
   Ispm is the maximum current to be supplied to the motor,
   Pmax is a maximum power usable by the apparatus,
   Ipcb is a current used by an element of the apparatus other than the motor, and Vpwr is the determined voltage.

14. The method of claim 13, wherein the determining of the maximum current further comprises determining the maximum current using a Vpwr value which is less than a maximum allowable voltage of the apparatus.

15. The method of claim 13, further comprising:
   starting the motor according to the determined maximum current, comprising applying the determined maximum current to the motor via a spindle driver.

16. The method of claim 13, further comprising determining Ipcb from a table in which Ipcb is previously detected and stored with respect to a constant unit of a variation of the supplied voltage.

17. The method of claim 13, further comprising determining Ipcb from a determined function of Ipcb versus the supplied voltage.

18. The method of claim 15, wherein the starting of the motor further comprises starting the motor after the determining of the maximum current.

19. A method to control a motor used in an apparatus to read or write data from or to an optical storage medium, the method comprising:
   determining a voltage supplied to the apparatus; and
   determining a maximum current to be supplied to the motor according to the determined voltage, wherein the motor is a brushless motor.

20. An apparatus to drive a disk, comprising:
   a motor to turn the disk; and
   a controller to calculate a maximum value of a current supplied to the motor based upon a maximum allowable power and a determined value of a voltage supplied to the apparatus.

* * * * *